United States Patent [19]

Machado et al.

[11] Patent Number: 5,200,460
[45] Date of Patent: Apr. 6, 1993

[54] POLYACETAL POLYMER BLENDS

[75] Inventors: Joseph M. Machado, Richmond; Randall P. Gingrich, Houston, both of Tex.

[73] Assignee: Shell Oil Company, Houston, Tex.

[21] Appl. No.: 693,191

[22] Filed: Apr. 30, 1991

[51] Int. Cl.⁵ .............................. C08L 61/02
[52] U.S. Cl. ................... 524/494; 524/540; 525/154
[58] Field of Search ............ 524/494, 540; 525/154

[56] References Cited

U.S. PATENT DOCUMENTS

| | | | |
|---|---|---|---|
| 2,947,727 | 8/1960 | Bartz et al. | 260/67 |
| 2,947,728 | 8/1960 | Bartz et al. | 260/67 |
| 3,027,352 | 3/1962 | Walling et al. | 260/67 |
| 3,072,609 | 1/1963 | Berardinelli et al. | 260/67 |
| 3,869,292 | 3/1975 | Peters | 96/115 R |
| 4,028,340 | 6/1977 | Kanezaki | 260/47 |
| 4,221,700 | 9/1980 | Minagawa et al. | 524/302 |
| 4,289,676 | 9/1981 | Czauderna et al. | 260/29.6 H |
| 4,439,516 | 3/1984 | Cernigliaro et al. | 430/323 |
| 4,517,349 | 5/1985 | Fujiwara et al. | 526/313 |
| 4,645,805 | 2/1987 | Gaku et al. | 524/539 |
| 4,670,508 | 6/1987 | Ohdaira et al. | 525/154 |
| 4,780,498 | 10/1988 | Goerrissen et al. | 524/542 |
| 4,900,769 | 2/1990 | Kimura et al. | 524/312 |
| 5,079,301 | 1/1992 | Machado et al. | 525/154 |

FOREIGN PATENT DOCUMENTS 0138609 10/1984 European Pat. Off. .

OTHER PUBLICATIONS

U.S. Ser. No. 564,212, filed Aug. 8, 1990, Machado et al, Molecularly Miscible Polymer Blends of Polyvinyl Phenol and Polyacetal.

Primary Examiner—Paul R. Michl
Assistant Examiner—Andrew E. C. Merriam
Attorney, Agent, or Firm—James O. Okorafor

[57] ABSTRACT

A composition having and exhibiting improved mechanical properties comprising of a polyacetal polymer, glass fibers, and polyvinyl phenol polymer is disclosed.

13 Claims, No Drawings

POLYACETAL POLYMER BLENDS

FIELD OF THE INVENTION

This invention generally relates to polyacetal blends. More particularly, this invention relates to blends of polyacetal, polyvinyl phenol and glass fibers.

BACKGROUND OF THE INVENTION

Polyacetal polymers are known in the art. Likewise, the use of glass fibers as reinforcing materials is known in the art. When glass fibers are used to reinforce polyacetal polymers, glass-matrix adhesion can be by means of chemical coupling agents, which form chemical bonds between the glass surface and polymer matrix. These coupling agents along with surface modifiers collectively referred to as sizing materials are added to the glass usually during its manufacturing. In simple terms, the glass is said to have been treated with a sizing material(s).

Silane compounds and/or derivatives are generally used as sizing materials. For polyacetal glass blends, azidosilane compounds are typically used as the coupling component of the glass fibers. However, the degree of adhesion produced by this combination is not sufficient to permit its utilization in certain applications which require maximum strength and stiffness. Thus, there exists a need for a reinforced polyacetal compound having improved fiber-matrix adhesive strength.

It is known in the art that the relatively modest strength of fiber reinforced polyacetal is a result of the relatively low reactivity of this polymer towards available coupling agents. Other thermoplastic polymers matrices such as polyamides are more reactive than polyacetal. This low reactivity of polyacetal polymers can be overcome by using the teachings of this invention.

In a nutshell, these teachings of this invention include the use of a known polymer, polyvinyl phenol, in a novel application involving the modification of the polyacetal matrix so as to enhance its adhesion to glass fibers.

Thus, it is a discovery of this invention that the addition of polyvinyl phenol to a polyacetal-glass fiber blend results in a compatible composition having improved adhesive strength.

SUMMARY OF THE INVENTION

It is a general object of this invention to provide a polyacetal composition having improved mechanical properties.

It is a further object of this invention to provide a polyacetal matrix having improved adhesion to reinforcing glass fibers.

In accordance with this invention, it is now provided, a polyacetal composition having improved mechanical properties comprising polyacetal polymer, glass fibers, and polyvinyl phenol.

DETAILED DESCRIPTION OF THE INVENTION

The materials useful in practicing this invention include polyacetal polymer, glass fibers, and polyvinyl phenol. In general, the practice of this invention involves suitably admixing suitable quantities of the useful materials.

The polyacetal polymer that is useful in the practice of this invention is a polyoxyalkylene polymer which is at least predominantly a polyoxymethylene polymer. The polymer is illustratively produced by polymerization of formaldehyde, provided as such or from a formaldehyde source, and optionally has polymerized therewith a small proportion of a second compound such as a low molecular weight cyclic ether which is not a formaldehyde source. One preferred formaldehyde source is 1,3,5-trioxane which is viewed as a formaldehyde trimer. The cyclic ether which is preferred as an optional comonomer of the polyacetal polymer is a low molecular weight cyclic ether of up to 10 carbon atoms inclusive and up to 2 oxygen atoms inclusive. One class of such cyclic ethers is the group of compounds known as oxirane compounds or olefin oxides having two carbon atoms and one oxygen atom in a cyclic three-membered ring. Such olefin oxides have up to 10 carbon atoms inclusive and are suitably hydrocarbon olefin oxides such as ethylene oxide, propylene oxide, 2-butylene oxide and 1-octene oxide or are halohydrocarbon olefin oxides, preferably chlorohydrocarbon olefin oxides such as epichlorohydrin. Other cyclic ethers with one oxygen but more than two carbon atoms in the ring are the polymethylene oxides including hydrocarbon polymethylene oxides such as trimethylene oxide, tetramethylene oxide and pentamethylene oxide as well as halohydrocarbon, preferably chlorohydrocarbon, polymethylene oxides such as 2,2-di(chloromethyl)trimethylene oxide. Cyclic ethers of more than one oxygen in the ring, such as 1,3-dioxolane and 1,4-dioxane, are preferred.

The polyacetal resin prepared from formaldehyde has a high molecular weight and a structure typified by the following:

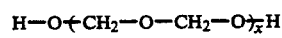

where terminal groups are derived from controlled amounts of water and the x denotes a large (typically 1500) number of formaldehyde units linked in head-to-tail fashion. To increase thermal and chemical resistance, terminal groups are typically converted to esters or ethers.

Also included in the term polyacetal resins are the polyacetal copolymers, such as those listed in British Patent No. 807,589 (Du Pont), which include other monomers capable of providing active hydrogens, such as alkylene glycols, polythiols, vinyl acetate/acrylic acid copolymers, or reduced butadiene/acrylonitrile polymers. This patent disclosure is herein incorporated by reference.

Preferred polyacetal polymers comprise at least 85 mole percent, preferably at least 90 mole percent, based on total polyacetal polymer of polyoxymethylene, the unit derived from formaldehyde, with an optional amount of no more than 15 mole percent, preferably no more than 10 mole percent, based on total polyacetal polymer, of a cyclic ether polymerized with the polyoxyalkylene. Although block copolymers of formaldehyde are known wherein a polyoxymethylene block is attached to a block of a second polymerized monomer, e.g., the cyclic ether, the preferred polyacetal polymers, when copolymers are employed, are the more typical random copolymers, wherein the monomers are copolymerized and the moieties of cyclic ether occur randomly throughout the polymer chain. Although such copolymers are suitable for the blends of the invention it is generally preferred to use homopolymers of formaldehyde without any substantial amount of comonomer.

Such preferred polyacetal polymers, are represented by the repeating formula:

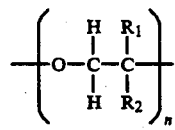

wherein each $R_1$ and $R_2$ independently is hydrogen, an alkyl radical containing up to 4 carbon atoms, or a haloalkyl of up to 4 carbon atoms and 2 halogens inclusive, preferably a haloalkyl of up to 1 halogen wherein the halogen is chloro, and n is an integer from 0 to 3 inclusive, with n being 0 in at least 85% of the repeating units. These polyacetal polymers are produced by polymerizing at least 85 mole percent of formaldehyde with up to 15 mole percent, based on total polyacetal polymer, of the cyclic ether of the formula:

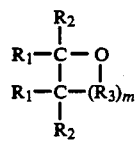

wherein each $R_1$ and $R_2$ is either hydrogen, an alkyl of up to 4 carbon atoms inclusive, or a haloalkyl of up to 4 carbon atoms and 2 halogens inclusive, preferably haloalkyl of up to 1 halogen wherein the halogen is chloro; $R_3$ is methylene, oxymethylene, alkyl on haloalkyl substituted methylene, or alkyl or haloalkyl substituted oxymethylene; and m is an integer from 0 to 3 inclusive. Illustrative cyclic ethers are described above. Preferred cyclic ethers for copolymerization with formaldehyde when copolymer polyacetal polymers are employed are ethylene oxide and 1,3-dioxolane. Certain of the preferred formaldehyde/ethylene oxide copolymers are commercially available and are marketed by Hoechst Celanese under the tradename CELCON ® Polyacetal. A polyacetal molding composition is described in U.S. Pat. No. 4,274,986 (Ikenaga et al.), assigned to Celanese, and incorporated herein by reference. Other polyacetal homopolymers and copolymers are available from DuPont under the tradename DELRIN ® Polyacetal.

The polyacetal polymers are produced by polymerization of formaldehyde (or a formaldehyde source) and, optionally, up to 15 mole percent of the cyclic ether comonomer in the presence of a Friedel Crafts catalyst, preferably complexed with an electron-rich molecule. The Friedel Crafts catalysts are metal halides having acidic properties. This class of catalysts include the halides but preferably the fluorides or chlorides of boron, aluminum, iron, tin and other metals as is known in the art. The catalysts are often provided as a complex of an electron-rich oxygen compound such as an ether, but complexes with an alkanol or an alkanoic acid are also suitable. The production of polyacetal polymers is generally well known in the art and is taught by, for example, U.S. Pat. No. 2,947,727 and U.S. Pat. No. 2,947,728 (both Bartz), U.S. Pat. No. 3,027,352 (Walling) and U.S. Pat. No. 3,072,609 (Berardinelli). These patent disclosures are herein incorporated by reference.

The precise percentage of the polyacetal polymer to be employed in the blends of the invention will depend upon the anticipated end use for the blend. Compositions containing from about 40 wt % to about 95 wt %, based on total blend, provide useful propeties, with 50 wt % to about 90 wt % being preferred. Particularly preferred are compositions containing from about 60 to 80 wt % of polyacetal.

Generally speaking, chopped glass fibers are useful in the practice of this invention. It is desirable that these glass fibers be treated to contain a film former. Examples of useful film formers include starch, polyethylene oxide, epoxides of bis-phenol A, and aliphatic polyurethanes. Polyurethane is the preferred film former.

These chopped glass fibers may also contain a bonding agent. Typically, these bonding agents are selected from among a group of silane compounds and/or derivatives. Examples of such include trimethoxy azidosilane, and trimethoxyaminosilane.

Information relating to glass fibers is well known in the art and is easily accessible. Illustrative of a source for obtaining such information is U.S. Pat. No. 4,289,676, which is herein incorporated by reference.

The glass fibers component of the inventive composition can be within the range of from about 5 to 50 wt %, preferably from about 10 to 40 wt %, and particularly preferred from about 20 to 35 wt %.

The polyvinyl phenol polymers useful in the practice of this invention are homopolymers and copolymers of ortho-, meta- and para-vinyl phenols. Polyvinyl phenols may be illustrated by the following formula for para-vinyl phenol:

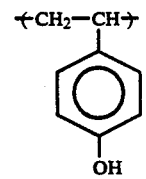

The vinyl phenols polymerized may be non-substituted or may carry any of various substituents that do not markedly affect the phase behavior of the polymer blend.

The molecular weight of the polymer does not appear to be a critical factor. Those having a number averaged molecular weight of between 2,000 and 75,000 are preferred, but the polymers having molecular weights lower or higher than this range may also be used.

The polyvinyl phenol may be prepared by bulk polymerization, emulsion polymerization or solution polymerization of the corresponding monomers in the presence of a cationic catalyst such as boron trifluoride etherate. Such procedures are well known in the art.

High purity para-vinyl phenol polymers may be prepared by several methods known in the art. A high purity para-vinyl phenol polymer may be produced by polymerizing para-vinyl phenol in the presence of phenols without unsaturated side chains, and in the presence of a polymerization accelerator. High purity para-vinyl phenol may also be produced by dehydrogenating crude para-ethylphenol, polymerizing the resulting crude para-vinyl phenol without purification, and then purifying the resulting polymerization product. Hoechst Celanese commercially produces a high purity para-vinyl phenol polymer by polymerization of a high purity para-acetoxystyrene monomer, followed by hydrolysis to para-vinyl phenol polymer.

Vinyl phenols useful for the production of polymers may be prepared, for example, by hydrolysis of commercially available coumarin or substituted coumarins, followed by decarboxylation of the resulting hydroxy cinnamic acids. Useful vinyl phenols may also be prepared by dehydration of the corresponding hydroxy alkyl phenols or by decarboxylation of hydroxy cinnamic acids resulting from the reaction of substituted or non-substituted hydroxybenzaldehydes with malonic acid. Various processes suitable for production of vinyl phenol are well known in the art.

Polyvinyl phenols are described in U.S. Pat. No. 3,869,292 (Peters) and in U.S. Pat. No. 4,439,516 (Cernigliaro et al.), both of which are incorporated herein by reference, and in European Patent Application 138,609 (Nippon Oil). The disclosure of this patent is herein incorporated by reference. The production of high-purity p-vinyl phenols is described in U.S. Pat. No. 4,028,340 (Kanezaki) and in U.S. Pat. No. 4,517,349 (Fujiwara et al.), both of which are incorporated herein by reference.

The precise percentage of the polyvinyl phenol polymer to be employed in the blends of the invention will depend upon the end use for the blend. Compositions containing from about 1 wt % to about 20 wt %, based on total blend, are useful for compatibilizing the polyacetal polymers glass-fiber blend. The preferred and most preferred ranges of polyvinyl phenol useful in the practice of this invention are from about 2 to 15 wt % and 3 to 10 wt % respectively.

The blends of the invention may also include additives such as antioxidants and stabilizers, dyes, fillers or reinforcing agents, fire resistant materials, mold release agents, colorants and other materials designed to improve the processability of the polymers or the properties of the resulting blend. Such additives are added prior to, together with or subsequent to the blending of the polyacetal and the other components.

The method of producing the composition of the invention is not material so long as a uniform blend is produced without undue degradation of the blend or its components. In one modification the polymer components of the blend are extruded in a corotating twin screw extruder to produce the blend. In practicing this modification, care must be exercised so that the average length of the reinforcing glass fibers are not excessively reduced due to mechanical breakage. Excessive reduction of the average length of the glass fibers adversely affects the mechanical properties of the resulting compositions. Determination of an appropriate average length will vary with processing conditions and materials, but is within the competence of one of ordinary skill in the art. The blends are processed by methods such as extrusion and injection molding into sheets, films, plates and shaped parts. Illustrative of such applications are the production of articles useful in both rigid and flexible packaging applications. Specific applications include films, containers, and bottles, which may be made by thermoforming injection or extrusion blow molding, etc. The blends find particular utility in the production of both internal and external parts for the automotive industry and structural parts for application in the construction industry. The blends of the invention could also be used as coatings for materials such as glass or metal.

The invention is further illustrated by the following Examples, which should not be construed as limiting the invention.

EXAMPLES

Blends were prepared of a polyacetal polymer (Celcon M-90 purchased from Hoechst Celanese) and a polyvinyl phenol also purchased from Hoechst Celanese. The polyvinyl phenol had a number average molecular weight of 50,500 and a density of 1.16 g/cc. The blends were reinforced with electrical-grade borosilicate chopped glass fibers, available from PPG Fiberglass. The reinforced blends were compared with samples of the neat polyacetal polymer, and the neat polyacetal polymer reinforced with glass fibers. The samples prepared were labelled from A to F as shown in Table 1.

The samples were compounded on a Haake 30 mm co-rotating twin screw extruder, operating at 200 RPM with melt temperatures of 240° C. Subsequent to blending, specimens of the blends were molded into plaques on a 25 ton Arburg injection molding machine. Molded samples were stored over desiccant until tested. Mechanical testing using conventional methods were performed on "dry as molded" samples.

TABLE 1

|   | Polyacetal | | Polyvinyl[2] Phenol | | Glass Fibers | | Flexural[1] Modulus (psi) | Tensile Strength (psi) | Flexural Strength (psi) | Notched Izod (ft-lb/in) |
|---|---|---|---|---|---|---|---|---|---|---|
|   | wt % | (vol %) | wt % | (vol %) | wt % | (vol %) | | | | |
| A | 100 | (100) | 0 | (0) | 0 | (0) | 410,000 | 8,710 | 13,000 | 1.0 |
| B | 81 | (90) | 0 | (0) | 19 | (10) | 728,000 | 9,080 | 13,840 | 0.77 |
| C | 80 | (89) | 1 | (1) | 19 | (10) | 759,000 | 9,840 | 14,140 | 0.68 |
| D | 78 | (87) | 3 | (3) | 19 | (10) | 839,000 | 11,080 | 15,370 | 0.63 |
| E | 72 | (80) | 9 | (10) | 19 | (10) | 974,000 | 13,700 | 19,140 | 0.62 |
| F | 90 | (90) | 10 | (10) | 0 | (0) | — | 6,540 | — | — |

[1]Secant Modulus at 1% strain.
[2]Polyhydroxy Styrene obtained from Hoechst Celanese.

The data in Table 1 shows that glass fibers can be incorporated into polyacetal to improve mechanical properties, especially flexural modulus (compare B vs. A). The data further shows that in the presence of a relatively minor amount of PVP, the reinforcing capabilities of the glass fibers is signifciantly enhanced. For example, 1% of PVP improves tensile strength by 8% (compare C vs. B); and 9% of PVP improves flexural modulus by 34%; tensile strength by 51%; and flexural strength by 38% (compare E vs. B).

Thus, the data in Table 1 supports and proves the inventive claims of improved mechanical properties for the inventive compositions.

That which is claimed is:

1. A composition comprising a blend of a polyacetal polymer, glass fibers, and from about 1.0 wt % to about 20 wt % of unsubstituted polyvinyl phenol polymer.

2. A composition as in claim 1 wherein the polyacetal polymer is represented by the formula

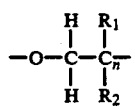

wherein each $R_1$ and $R_2$ is hydrogen, alkyl of up to 4 carbon atoms inclusive, or haloalkyl of up to 4 carbon atoms, and n is an integer from 0 to 3 inclusive with n being 0 in at least 85% of the repeating units.

3. A composition as in claim 2 wherein the polyacetal polymer is at least 85 mole percent of polymerized formaldehyde, and up to 15 mole percent of ethylene oxide or 1,3-dioxolane is copolymerized therewith.

4. A composition as in claim 3 wherein the polyacetal polymer is produced by the polymerization of 1,3,5-trioxane.

5. A composition as in claim 1 wherein the glass fiber contains a film former.

6. A composition as in claim 4 wherein the film former is an aliphatic polyurethane.

7. A composition comprising a blend of a polyacetal polymer, glass fibers, and from about 3 wt % to about 10 wt % of unsubstituted polyvinyl phenol polymer.

8. A composition as in claim 1 wherein the polyacetal comprises from about 40 wt % to about 95 wt % of the total blend.

9. A composition as in claim 1 wherein the polyacetal comprises from about 60 wt % to about 80 wt % of the total blend.

10. A composition as in claim 1 wherein the glass fibers comprises from about 5 wt % to about 50 wt % of the total blend.

11. A composition as in claim 1 wherein the glass fibers comprise from about 20 wt % to about 35 wt % of the total blend.

12. An article prepared from the composition of claim 1.

13. An article coated with the composition of claim 1.